US008873442B2

(12) United States Patent
Hering et al.

(10) Patent No.: US 8,873,442 B2
(45) Date of Patent: Oct. 28, 2014

(54) SYSTEM AND METHOD FOR NOTIFYING BACK OFFICE PRIOR TO END OF TELEMATICS UNIT STANDBY PERIOD

(75) Inventors: Carl J. Hering, Farmington Hills, MI (US); Timothy R. Nixon, Northville, MI (US)

(73) Assignee: General Motors LLC, Detroit, MI (US)

( * ) Notice: Subject to any disclaimer, the term of this patent is extended or adjusted under 35 U.S.C. 154(b) by 706 days.

(21) Appl. No.: 12/959,572

(22) Filed: Dec. 3, 2010

(65) Prior Publication Data
US 2012/0140688 A1 Jun. 7, 2012

(51) Int. Cl.
G08C 17/00 (2006.01)
H04W 52/02 (2009.01)

(52) U.S. Cl.
CPC .............................. *H04W 52/0261* (2013.01)
USPC ........... 370/311; 455/518; 455/444; 455/436; 455/403; 340/539.16; 320/109; 370/208; 370/331; 370/329

(58) Field of Classification Search
USPC ............... 370/311; 455/518, 444; 340/539.16
See application file for complete search history.

(56) References Cited

U.S. PATENT DOCUMENTS

| | | | | |
|---|---|---|---|---|
| 7,437,183 B2* | 10/2008 | Makinen | ................... | 455/569.1 |
| 2003/0139173 A1* | 7/2003 | Mazzara et al. | ............... | 455/418 |
| 2003/0232619 A1* | 12/2003 | Fraser | ........................ | 455/420 |
| 2004/0203730 A1* | 10/2004 | Fraser et al. | ................ | 455/426.1 |
| 2005/0254460 A1* | 11/2005 | Fraser et al. | ................. | 370/328 |
| 2005/0266874 A1* | 12/2005 | Lai et al. | ..................... | 455/552.1 |
| 2006/0241817 A1* | 10/2006 | Patenaude | ........................ | 701/1 |
| 2008/0085689 A1* | 4/2008 | Zellner | ..................... | 455/187.1 |
| 2010/0034160 A1* | 2/2010 | Prakash et al. | ................ | 370/329 |
| 2010/0100342 A1* | 4/2010 | Kressner et al. | ............... | 702/62 |
| 2010/0117585 A1* | 5/2010 | Fitch et al. | ............... | 318/568.12 |
| 2012/0086395 A1* | 4/2012 | Kim et al. | ..................... | 320/109 |

* cited by examiner

*Primary Examiner* — Faruk Hamza
*Assistant Examiner* — Shah R Zaman
(74) *Attorney, Agent, or Firm* — Leydig, Voit & Mayer, Ltd.

(57) ABSTRACT

The described method and system provide for notification to network applications by a telematics unit in standby mode of when the telematics unit is switching away from standby mode and will be come unavailable for communication with the network applications. The network application may include mobile applications for mobile devices (such as smartphones) and web applications accessible through web pages. The telematics unit may communicate with the back office(s) of the network applications. If the vehicle is a plug-type vehicle, the telematics unit or network application may further extend the standby period of the telematics unit or vehicle when the vehicle is plugged in.

16 Claims, 4 Drawing Sheets

SYSTEM AND METHOD FOR NOTIFYING BACK OFFICE PRIOR TO END OF TELEMATICS UNIT STANDBY PERIOD

BACKGROUND OF THE INVENTION

Wireless communication services for mobile vehicles, such as navigation and roadside assistance, have increased rapidly in recent years. Most of the services that have been offered are for a mobile vehicle in operation, but more recently, the demands and potential for services to a turned-off vehicle have grown. Services that may be requested while the vehicle is in an off or standby state may include maintenance and diagnostic functions, system updates, vehicle position determination, unlocking of the doors, or vehicle alarm silencing. These services may be requested through various applications over a network such as mobile applications accessible from a user's mobile phone or web applications accessible through a website on the Internet.

Normally when the mobile vehicle ignition is off, a telematics unit within the is placed into a powered-down discontinuous-receive (DRx) or standby state (also called a sleep cycle) to minimize power drain on the vehicle battery. To perform a requested function while the vehicle ignition is off, the telematics unit may be awakened, the desired function performed, and the telematics unit subsequently placed back into the DRx or standby state. For example, a telematics unit may monitor a satellite broadcast channel for a command signal. Based on the command signal, the cellular unit of the telematics unit is powered up. The telematics unit may then call a telematics service provider's (TSP) call center to receive and perform a service request. Alternatively, a data message sent by the call center containing a service request, may be waiting for the telematics unit when it awakes. After performing the service, the telematics unit may return to the standby state.

Even while a telematics unit is in standby state, a network access device (NAD) of the telematics unit may consume power, draining the vehicle's battery. Thus, after a certain amount of time (or the occurrence of some other trigger, such as manually disabling the DRx or standby state of the telematics unit), the telematics unit may end the standby period and switch to a different mode, such that the telematics unit may be unavailable to be contacted by network applications such as mobile applications or web applications.

Thus, it is an object in part to provide a system and method for notifying network applications, which may notify users, that a telematics unit will be unavailable for contact when the telematics unit is ending its standby period. However, while this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and method for notifying network applications, such as mobile applications or web applications, which may further notify users, that a telematics unit will be unavailable for contact when the telematics unit is ending its standby period. In one implementation of the present invention, a telematics unit in standby mode may initiate contact with an application prior to the end of the telematics unit's standby period. The standby period may be a predetermined amount of time, and may end when the time has elapsed, or may be ended by some other trigger (such as manually switching the telematics unit away from standby mode). In a further implementation, the telematics unit may contact a "back office" unit associated with the network application. The "back office" may include components such as, but not limited to, database servers and application servers. A user of the network application, whether a mobile application or website-based application or other type of application, may interact with a "front office" web page or mobile display or other user interface, depending on the type of application. When the telematics unit contacts the back office of the application, the telematics unit may send data to the application (such as data relating to vehicle diagnostics, the vehicle location, status updates, etc.) and may notify the application that the telematics unit is going to end the standby period. The application may further display the data to a user of the application and inform the user that the telematics unit or vehicle is ending its standby period and will be unavailable for contact through the application.

In yet another further implementation, if the vehicle is a plug-in type vehicle (e.g., an electric vehicle that can be charged through a plug), the back office of the application may check if the vehicle is plugged in. If the vehicle is plugged in, the back office may extend the standby time for an additional period of time. In yet another further implementation, the back office may be notified if the vehicle is unplugged, and the back office may further reset the standby period of the telematics unit to the original predetermined standby period.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for notifying network applications, such as mobile applications or web applications, that a telematics unit will be unavailable for contact when the telematics unit is ending its standby period. For plug-in type electric vehicles, the application may determine whether the vehicle is plugged in, and if it is, may extend the standby period rather than end it. Given this overview, an exemplary environment in which the invention may operate is described hereinafter. It will be appreciated that the described environment is an example, and does not imply any limitation regarding the use of other environments to practice the invention.

Figure 1:
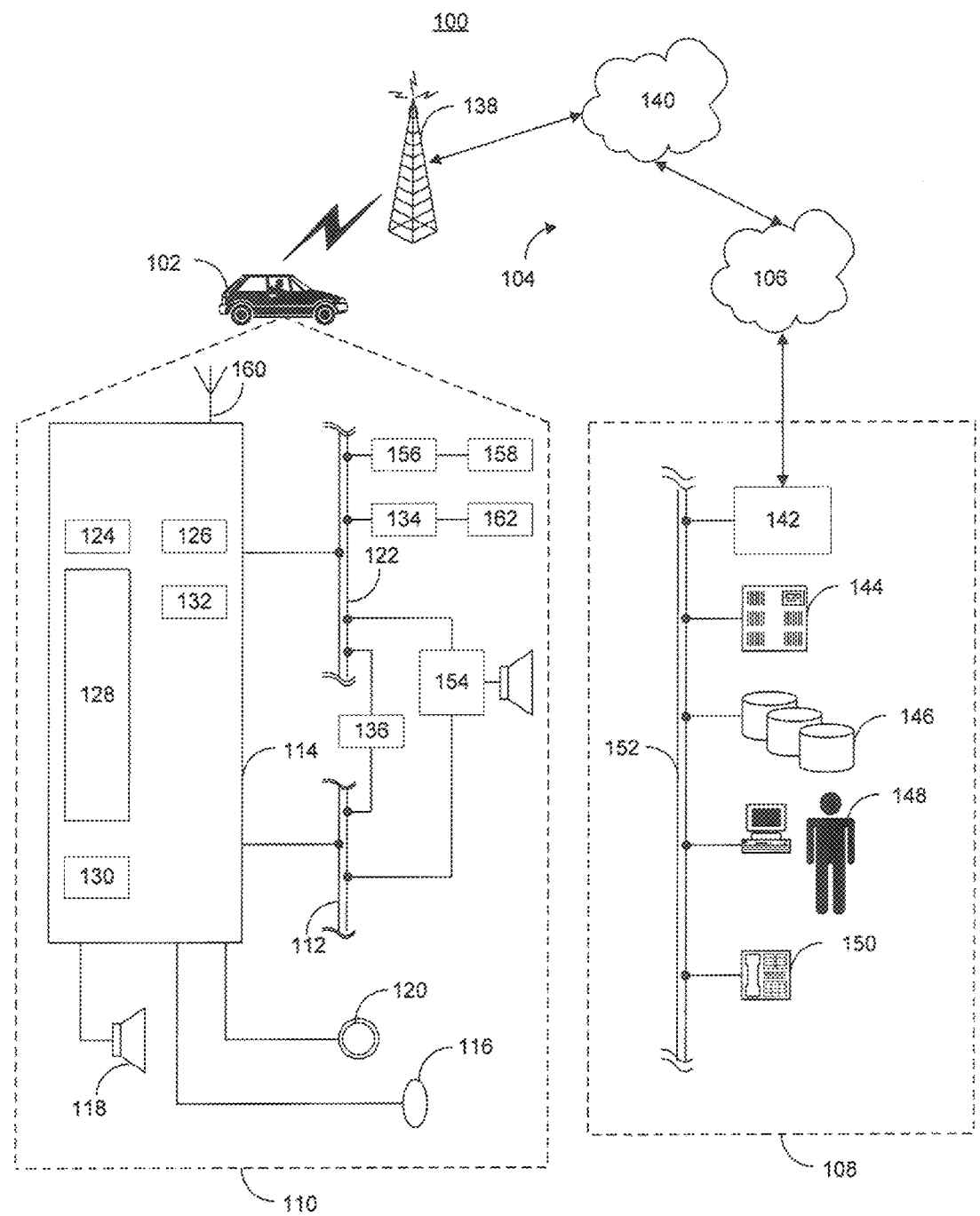
FIG. 1 is a schematic diagram of an operating environment for a mobile vehicle communication system usable in implementations of the described principles.

With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
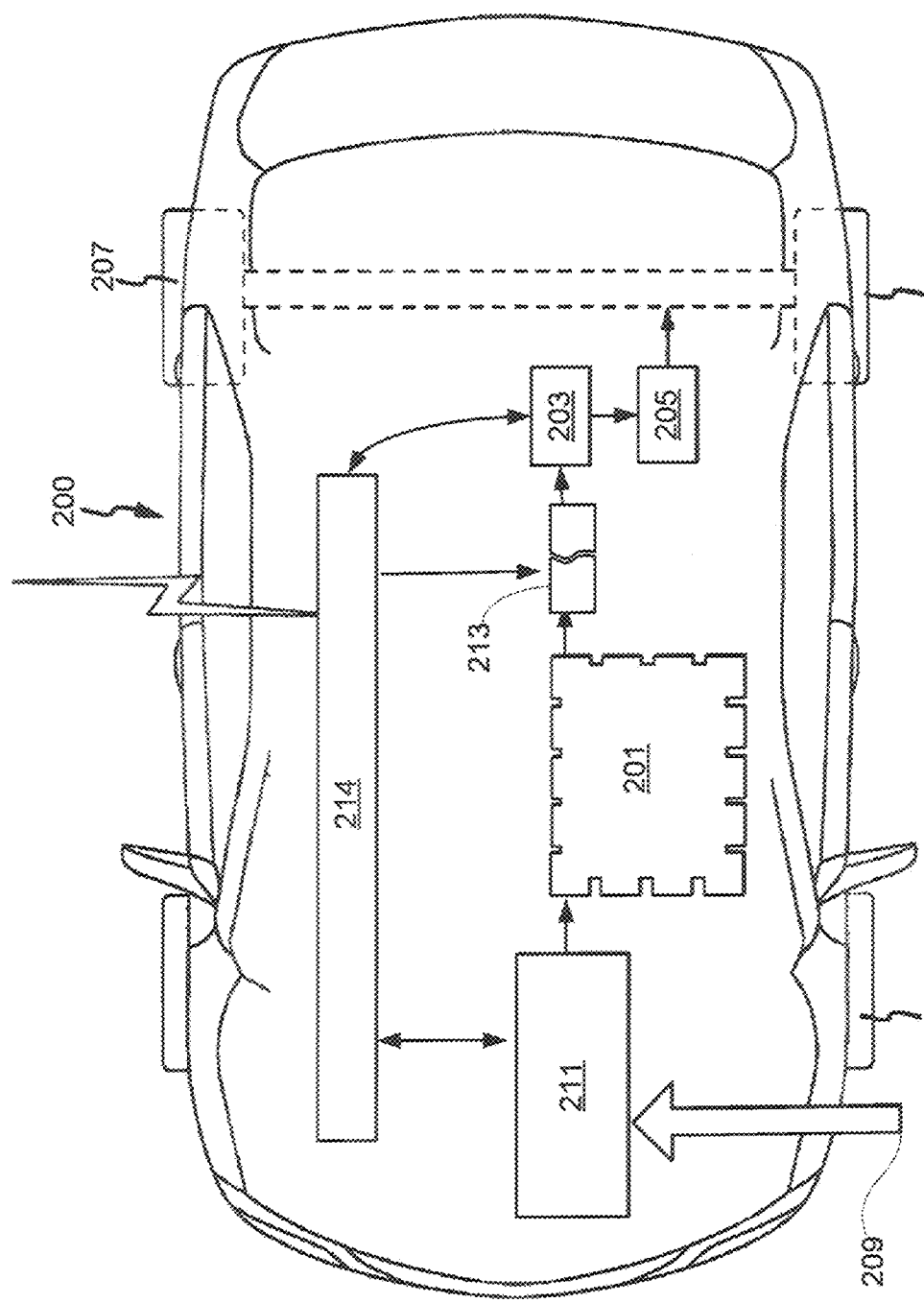
FIG. 2 is a schematic vehicle diagram showing relevant power links and communications linkages within the vehicle and between the vehicle and a remote entity.

As noted above, the telematics unit 114 and associated components are associated in an implementation of the invention with a vehicle 102. In particular, the vehicle 102 is a hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201 which is a battery or battery bank ("battery") of suitable voltage and capacity. Suitable battery types include but are not limited to lead acid batteries, Nickel Cadmium batteries (NiCd), Nickel Metal Hydride batteries (NiMH), Lithium Ion batteries and Lithium Polymer batteries.

The battery 201 is conductively linkable, e.g., via a motor controller 203, to an electrical drive unit 205, e.g., an electrical motor or motors. The electrical energy may be modulated, voltage-modified, or otherwise modified by the motor controller 203 as needed to drive the electrical drive unit 205. The electrical drive unit 205 is linked or linkable to a ground engaging drive, typically including one or more wheels 207.

In one optional implementation, a plug interface 209 is provided in order to charge the battery 201, although it will be appreciated that the teachings herein apply beyond vehicles having plug-in architectures as well. The plug interface 209 is linked to the battery 201 via a charge controller 211. The telematics unit 214 (114) is adapted to receive information from the controller 211 as discussed above and to convey data regarding the battery as will be discussed more fully hereinafter. An optional aspect of the vehicle 200 and battery 201 is the ability to electrically disconnect the battery 201 from the rest of the vehicle by controlling at least one and preferably two or more high voltage contactors 213 if an adverse condition is detected.

In an implementation, the responsibility for battery charge state sensing and analysis is vested in the charge controller 211. Alternatively, the charge controller 211 may be responsible for sensing battery charge state, while the telematics unit 214 is responsible for analysis of charge state and creation of charge reminders. In either case, the telematics unit 214 is responsible for the transmission of the charge reminder to the user mobile device.

Figure 3:
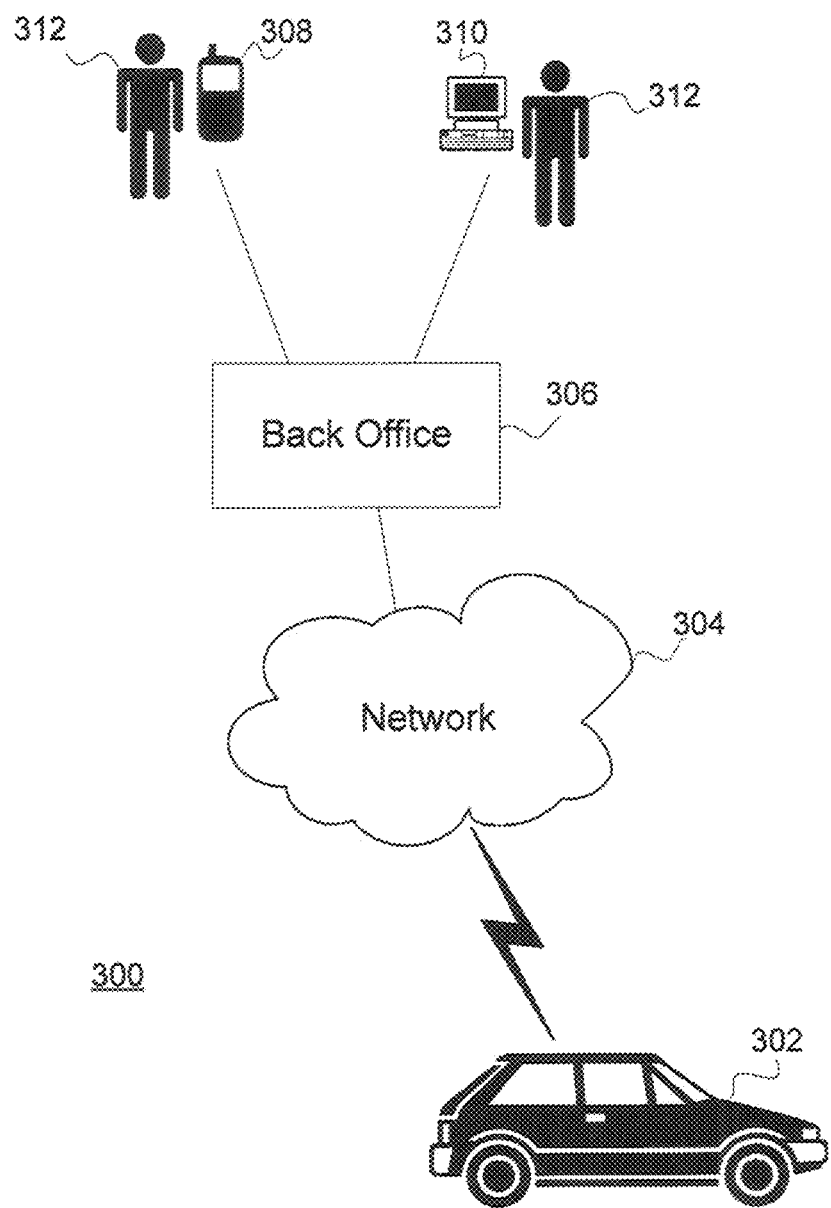
FIG. 3 is a schematic diagram showing relevant connections between users, network applications and the vehicle in one implementation.

With further reference to the architecture of FIGS. 1 and 2, and turning more specifically to FIG. 3, a schematic 300 showing the connection between network applications and a telematics unit of a vehicle 302 is shown. The telematics unit of the vehicle 302 is connected through a network 304, such as, for example, the wireless carrier system 104 of FIG. 1 and the Internet, to a back office unit 306. One skilled in the art will appreciate that conventional network applications such as mobile applications on mobile devices (such as "apps" for smartphones) and web applications of websites may be configured such that a user of the application interacts only with a "front office" user interface of the network application, and a "back office" of the network application controlled by an entity that maintains operation of the application may perform data storage and data processing (as well as other functions) related to the functionality of the network application.

The front and back office may be connected over an internal network and may be accessible via the Internet or other communications network. A typical user of the mobile device or computer or other device accessing the network application may not be able to directly interact with the "back office" of the network application.

In FIG. 3, the back office unit 306 may store and process information relating to the TSP's subscribers, the status of the vehicle, or any other information corresponding to the network applications connected to the back office unit. In one implementation, the back office may be maintained by the TSP at the call center 106. In alternative implementations, the back office may be maintained by other entities, such as by wireless network service providers which provide websites and mobile applications relating to a telematics-based vehicle. Network applications, including but not limited to mobile applications for mobile devices 308, or web applications accessible through a computer 310 or any other device capable of accessing web pages, may connect to the back office to access and retrieve information regarding the vehicle and subscriber. A user 312 may interact with a front office user interface, i.e., the user interface of a mobile application on a mobile device 308 or a web page 310 of the web application.

For example, in one implementation, the network application may relate to vehicle diagnostics, allowing users to check on the status of certain vehicle components such as battery charge. The user may be able to interact with a front office user interface where the user may tell the network application to display the current battery charge, and the front office retrieves that information from a component of the back office which communicates with the telematics unit of the user's vehicle and stores status information regarding the vehicle. The front office may then display the retrieved information to the user.

In a further implementation, multiple mobile applications and web applications all access the same back office unit 306, as depicted in FIG. 3. Alternatively, separate back office units 306 may be maintained for each mobile application and web application.

Figure 4:
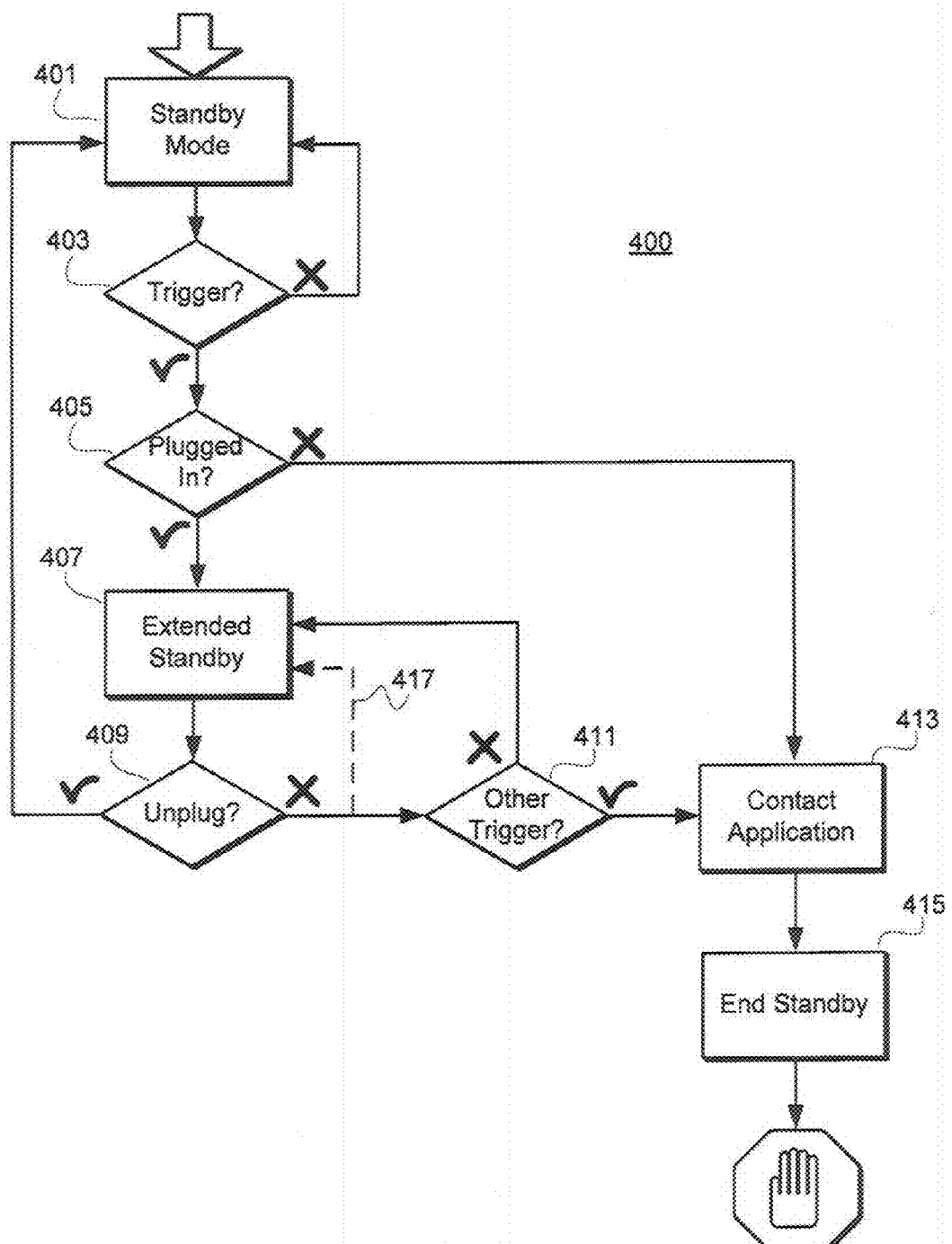
FIG. 4 is a flowchart illustrating a process for notifying applications when a telematics unit is ending its standby period in accordance with an implementation of the described principles.

With further reference to the architecture of FIGS. 1-3, and turning more specifically to FIG. 4, a process 400 for notifying network applications that the telematics unit is switching away from standby mode in one implementation is depicted. A vehicle or telematics unit may first enter into standby mode 401. When in standby mode, network applications such as mobile applications and web applications may communicate with the telematics unit of the vehicle. The vehicle may remain in standby mode until the occurrence of a certain trigger 403. In one implementation, the telematics unit or back office(s) of network applications monitors how long the vehicle has been in standby mode, and after a certain amount of time in standby mode has elapsed, the telematics unit or back office(s) may determine that the standby period should be ended. The telematics unit or back office(s) may include a time counter component that monitors the amount of time elapsed in standby mode. In a further implementation, other triggers may be implemented in addition to or instead of an elapsed-time trigger, such as manually disabling standby mode on the telematics unit.

Upon the occurrence of a trigger, the telematics unit may contact the back office(s) associated with network applications 413 to notify them that the telematics unit is ending the standby period and may be unavailable for communication with the network applications. The network applications may further notify users of the network applications that the vehicle is ending the standby period and may be unavailable for communication through the network applications. The network applications may further receive information regarding the vehicle (such as diagnostic or status information) and display that information to the users. Then, the telematics unit may end the standby period 415 and enter another mode where the telematics unit is unavailable for communication with network applications.

In a further implementation, the vehicle may be a plug-type vehicle (i.e. a vehicle capable of being plugged in to charge a vehicle battery), and the telematics unit or the back office(s) associated with network applications may determine whether or not the vehicle is plugged in 405. If the vehicle is not plugged in and the trigger 403 occurs, the telematics unit may contact the network applications 413 and notify them that the telematics unit is ending the standby period, as described above. If the vehicle is plugged in when the trigger 403 occurs, the telematics unit or back office(s) may extend the standby period 407 such that the vehicle or telematics unit remains in standby mode. The telematics unit or back office(s) may monitor whether the vehicle is unplugged 409 during the extended standby period. In one implementation, while the vehicle is plugged in, the vehicle may remain in standby mode until the occurrence of a second trigger 411, such as a certain amount of time elapsing or some other trigger such as manually ending the extended standby period. If the trigger occurs, the telematics unit may contact the network applications 413 as described above and end the extended standby period 415. In an alternative implementation, depicted by the dotted line 417 in FIG. 4, the vehicle may remain in standby mode as long as the vehicle is not unplugged, and thus the standby period may be extended indefinitely while the vehicle is plugged in.

If the vehicle is unplugged during the extended standby period in either of the above described alternative implementations, the telematics unit or back office(s) may restart a time counter for the standby period as if the vehicle or telematics unit had just entered standby mode originally 401. Thus when the vehicle is unplugged during the extended standby period, the time counter that keeps track of that amount of time may be reset, and the vehicle may remain in standby mode until trigger 403 occurs again. One skilled in the art will appreciate that the time counter and standby time monitoring may be implemented on the telematics unit or at the back office(s) with the back office(s) communicating data to and from the telematics unit.

The above principles may be better understood in the context of specific examples. A plug-in electric vehicle with a telematics unit may be configured such that the telematics unit enters standby mode when the vehicle is turned off 401. The first trigger 403 may be set such that the telematics unit remains in standby mode for one hour, and if the vehicle is plugged in, the standby period is extended by two additional hours. Given this vehicle, in one example, the vehicle is not plugged in and the driver of the vehicle shuts the vehicle off. The telematics unit enters standby mode 401, and after an hour of being in standby mode the trigger is set off 403, and because the vehicle is not plugged in 405, the telematics unit contacts network applications 413 to inform them that the standby period of the vehicle is ending, and the vehicle ends the standby period 415.

In a second example, the vehicle is plugged in, and remains plugged in for over three hours. In this example, the trigger 403 is set off after the vehicle has been in standby mode for one hour, but because the vehicle is plugged in 405, the standby period is extended by two additional hours 407. The vehicle is not unplugged during the extended standby period 409, and after the two hours of extended standby elapse, the second trigger 411 is set off and the telematics unit contacts network applications 413 as described above.

In a third example similar to the second example except that the vehicle is unplugged one hour into the extended two-hour standby period 409, the vehicle or telematics unit stays in standby mode after it is unplugged. When the vehicle is unplugged, the telematics unit behaves as if the vehicle is first entering standby mode 401. Thus after another one hour has elapsed after the vehicle has been unplugged, the trigger 403 is again set off, and the telematics unit or back office(s) of network applications check if the vehicle is plugged in 405, and the processing of FIG. 4 continues as depicted depending on whether the vehicle has been plugged in again or not.

It will be appreciated that the described system and method allows for the notifying of network applications, such as mobile applications or web applications, that a telematics unit will be unavailable for contact when the telematics unit is ending its standby period. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for processing a standby period of a telematics unit connected to a vehicle, the method comprising:
    determining, at the telematics unit, that vehicle ignition is off;
    in response to the determination that the vehicle ignition is off, switching, at the telematics unit, to a standby mode, wherein network applications are able to communicate with the telematics unit in the standby mode;
    determining, at the telematics unit, that a time period has elapsed while the telematics unit is in the standby mode;
    in response to determining the time period has elapsed, transmitting, by the telematics unit, data to at least one network application via a wireless network prior to the end of the standby period, wherein the data includes a notification that the telematics unit is going to switch from standby mode; and
    switching, at the telematics unit, from standby mode to a different mode, wherein network applications are not able to communicate with the telematics unit in the different mode.

2. The method of claim 1, wherein the transmitted data further includes data relating to a function of the network application to which the data is transmitted.

3. The method of claim 1, wherein the at least one network application further informs a user of the at least one network application that the telematics unit is going to switch from standby mode.

4. The method of claim 1, wherein the vehicle is a plug-in type vehicle having a battery that is chargeable via a plug interface.

5. The method of claim 4, wherein the duration of the time period is based on whether the vehicle is plugged in.

6. The method of claim 4, wherein the duration of the time period is extended continuously while the vehicle is plugged in until the vehicle is unplugged.

7. The method of claim 4, further comprising:
    determining, at the telematics unit, that the vehicle is plugged in, and in response increasing the duration of the time period.

8. The method of claim 2, wherein the telematics unit communicates with a back office associated with the at least one network application.

9. The method of claim 1, wherein the at least one network application is at least one of a mobile application accessible through a mobile device and a web application accessible through a web page.

10. A system for processing a standby period of a telematics unit connected to a vehicle, the system comprising:
    the telematics unit, connected to the vehicle, adapted to:
    determine that vehicle ignition is off;
    in response to the determination that the vehicle ignition is off, switch to a standby mode, wherein network applications are able to communicate with the telematics unit in the standby mode;
    determine that a time period has elapsed while the telematics unit is in the standby mode;
    in response to determining the time period has elapsed, transmit data to a network application via a wireless network prior to the end of the standby period, wherein the data includes a notification that the telematics unit is going to switch from standby mode; and
    switch from standby mode to a different mode, wherein network applications are not able to communicate with the telematics unit in the different mode; and
    the network application, adapted to communicate with a telematics unit in standby mode and to inform a user of the network application when the telematics unit is switching from standby mode.

11. The system of claim 10, wherein the at least one network application is at least one of a mobile application accessible through a mobile device and a web application accessible through a web page.

12. A non-transitory computer-readable medium of a telematics unit connected to a vehicle having processor-executable instructions stored thereon for processing a standby period of the telematics unit, the processor-executable instructions, when executed by a processor, facilitating performance of the following steps:
    determining that vehicle ignition is off;
    switching, in response to the determination that the vehicle ignition is off, the telematics unit to a standby mode, wherein network applications are able to communicate with the telematics unit in the standby mode;
    determining that a time period has elapsed while the telematics unit is in the standby mode;
    transmitting, in response to determining the time period has elapsed, data to a network application via a wireless network prior to the end of the standby period, wherein the data includes a notification that the telematics unit is going to switch from standby mode; and
    switching the telematics unit from standby mode to a different mode, wherein network applications are not able to communicate with the telematics unit in the different mode.

13. The non-transitory computer-readable medium of claim 12, wherein the vehicle is a plug-in type vehicle having a battery that is chargeable via a plug interface.

14. The non-transitory computer-readable medium of claim 13, wherein the duration of the time period is based on whether the vehicle is plugged in.

15. The non-transitory computer-readable medium of claim 13, wherein the duration of the time period is extended continuously while the vehicle is plugged in until the vehicle is unplugged.

16. The non-transitory computer-readable medium of claim 13, wherein the processor-executable instructions, when executed, further facilitate the performance of the following:

determining that the vehicle is plugged in and, in response thereto, increasing the duration of the time period.

\* \* \* \* \*